US008633884B2

(12) United States Patent
Baek et al.

(10) Patent No.: US 8,633,884 B2
(45) Date of Patent: Jan. 21, 2014

(54) LIQUID CRYSTAL DISPLAY HAVING DATA LINES DISPOSED IN PAIRS AT BOTH SIDES OF THE PIXELS

(75) Inventors: Seung-Soo Baek, Seoul (KR); Dong-Gyu Kim, Yongin-si (KR); Back-Won Lee, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1066 days.

(21) Appl. No.: 11/560,559

(22) Filed: Nov. 16, 2006

(65) Prior Publication Data

US 2007/0132684 A1 Jun. 14, 2007

(30) Foreign Application Priority Data

Dec. 6, 2005 (KR) ........................ 10-2005-0118067

(51) Int. Cl.

| | |
|---|---|
| ***G09G 3/36*** | (2006.01) |
| ***G06F 3/038*** | (2013.01) |
| ***G09G 5/10*** | (2006.01) |

(52) U.S. Cl.

USPC ................ 345/96; 345/89; 345/209; 345/690

(58) Field of Classification Search

USPC ............... 345/58, 87–104, 79, 204, 209, 690, 345/694–696

See application file for complete search history.

(56) References Cited

U.S. PATENT DOCUMENTS

| | | | | |
|---|---|---|---|---|
| 5,436,635 | A * | 7/1995 | Takahara et al. | 345/92 |
| 6,552,706 | B1 * | 4/2003 | Ikeda et al. | 345/96 |
| 6,922,183 | B2 * | 7/2005 | Ting et al. | 345/87 |
| 7,355,666 | B2 * | 4/2008 | Song et al. | 349/144 |
| 2001/0015716 | A1 * | 8/2001 | Kim | 345/96 |
| 2004/0189575 | A1 * | 9/2004 | Choi et al. | 345/96 |
| 2005/0046763 | A1 * | 3/2005 | Ono et al. | 349/39 |
| 2005/0122441 | A1 | 6/2005 | Shimoshikiryoh | |
| 2005/0184940 | A1 | 8/2005 | Oh et al. | |

FOREIGN PATENT DOCUMENTS

| | | | |
|---|---|---|---|
| CN | 1427391 | A | 7/2003 |
| CN | 1693945 | | 11/2005 |
| JP | 06-266315 | | 9/1994 |
| JP | 11-044885 | | 2/1999 |
| JP | 2000-235371 | | 8/2000 |

(Continued)

OTHER PUBLICATIONS

English Abstract for Publication No. JP2003-084737.

(Continued)

*Primary Examiner* — Bipin Shalwala

*Assistant Examiner* — Keith Crawley

(74) *Attorney, Agent, or Firm* — F. Chau & Associates, LLC

(57) ABSTRACT

A liquid crystal display having specific dispositions of pixels of a liquid crystal display so as to prevent the coupling defect and the stripe defect in high speed driving. The liquid crystal display includes a plurality of pixels arranged in a matrix shape, a switching element connected to each pixel, data lines and gate lines connected to the switching elements, and a data driver generating data voltages and applying the data voltages to the data lines. The data lines are disposed at both sides of the pixels in pairs, and data voltages of the same magnitude with different polarities are applied to the pairs of data lines. In this manner, preventing the coupling defect and the stripe defect, high speed driving can be performed.

22 Claims, 10 Drawing Sheets

(56) References Cited

FOREIGN PATENT DOCUMENTS

| | | |
|---|---|---|
| JP | 2001-033757 | 2/2001 |
| JP | 2002-023709 | 1/2002 |
| JP | 2002-196731 | 7/2002 |
| JP | 2003-084737 | 3/2003 |
| JP | 2003-228342 | 8/2003 |
| JP | 2003-295160 | 10/2003 |
| JP | 2004-054295 | 2/2004 |
| JP | 2004-302403 | 10/2004 |
| JP | 2005-309438 | 11/2005 |
| JP | 2005-316211 | 11/2005 |
| JP | 2006-301392 | 11/2006 |
| KR | 1020010015385 | 2/2001 |
| KR | 10-2005-0054858 | 6/2005 |
| KR | 10-2005-0089298 | 9/2005 |
| TW | 574522 | 2/2004 |
| TW | 583435 | 4/2004 |
| TW | 583615 | 4/2004 |
| TW | 594656 | 6/2004 |
| TW | I229217 | 3/2005 |

OTHER PUBLICATIONS

English Abstract for Publication No. CN1427391 A.
English Abstract for Publication No. 2004-302403.
English Abstract for Publication No. 10-2005-0089298.
English Abstract for Publication No. 10-2005-0054858.
English Abstract for Publication No. 2002-196731.
English Abstract for Publication No. 2000-235371.
English Abstract for Publication No. 2003-295160.
English Abstract for Publication No. 2005-316211.

* cited by examiner

LIQUID CRYSTAL DISPLAY HAVING DATA LINES DISPOSED IN PAIRS AT BOTH SIDES OF THE PIXELS

CROSS-REFERENCE TO RELATED APPLICATION

This application claims priority to and the benefit of Korean Patent Application No. 10-2005-0118067 filed in the Korean Intellectual Property Office on Dec. 6, 2005, the entire contents of which are incorporated herein by reference.

BACKGROUND OF THE INVENTION (a) Technical Field

The present disclosure relates to a liquid crystal display.

(b) Discussion of the Related Art

A conventional liquid crystal display (LCD) includes two display panels provided with pixel electrodes and a common electrode, and a liquid crystal layer interposed between the two panels and having dielectric anisotropy. The pixel electrodes are arranged in a matrix shape, and are connected to a switching element, such as a thin film transistor (TFT), so as to be sequentially applied with a data voltage row by row. The common electrode is formed on an entire surface of the display panel and is applied with a common voltage. The pixel electrodes, the common electrode, and the liquid crystal layer therebetween form a liquid crystal capacitor an overall circuit, and the liquid crystal capacitor is a basic unit constituent of a pixel along with a switching element connected thereto.

In such a liquid crystal display, voltages are applied to the two electrodes so as to form an electric field in the liquid crystal layer, and transmittance of light passing through the liquid crystal layer is regulated by regulating an amplitude of the electric field so as to obtain a desired image. In order to prevent a degradation phenomenon caused by the application of an electric field in one direction to a liquid crystal layer for a long period of time, the polarity of the data voltage with respect to the common voltage is inverted for respective frames, respective rows, or respective pixels.

Various methods are presently being tried as an effort to improve motion picture display characteristics of such a liquid crystal display, for example, a high speed driving method driving at the speed of 120 frames per second is under development. For high speed driving, a response speed of the liquid crystal should be two times the speed of 60 frames per second, and it is now estimated that this is possible.

In addition, since a large amount of electrical power is consumed as a result of the high frame speed used in the high speed driving technique, an attempt to minimize power consumption has been tried by adopting a column inversion in an inversion driving method.

The column inversion changes the polarity of a data voltage of the same data line by one frame, and since the number of inversions of the data voltage is one in one frame, power consumption characteristics are substantially enhanced.

There are two problems with the column inversion, however. One of the problems is a coupling defect, and the other is a stripe defect.

The coupling defect is a phenomenon that the respective luminances of an upper portion and a lower portion of a liquid crystal panel assembly become different from each other since a data voltage of the same polarity is continuously applied for one frame because of parasitic capacitance generated by an overlap of the data lines and the pixel electrodes. More specifically, a vertical crosstalk phenomenon occurs, where, if a box having a higher gray value than a root image is displayed on the root image having a low gray value, portions above and below the box have different gray values from the root image. In order to solve this coupling problem, a ratio of the parasitic capacitance due to the overlap of the data line and the pixel electrode to an entire capacitance of the device should be less than or equal to 1%, and to achieve this is difficult.

The stripe defect is a phenomenon where a stripe is formed when data voltages of the same polarity are applied in a vertical directions and there is a difference between data voltages of a positive polarity and a negative polarity.

The above information disclosed in this Background section is only for enhancement of understanding of the background of the invention and, therefore, it may contain information that does not form the prior art that is already known in this country to a person of ordinary skill in the art.

SUMMARY OF THE INVENTION

Exemplary embodiments of the present invention provide a liquid crystal display having the advantages of preventing the coupling defect and the stripe defect present in high speed driving of the display.

An exemplary embodiment of the present invention provides a liquid crystal display including: a plurality of pixels arranged in a matrix shape, a switching element connected to each pixel; data lines and gate lines connected to the switching elements; and a data driver generating data voltages and applying the data voltages to the data lines. The data lines are disposed at both sides of the pixels in pairs, and data voltages of the same magnitude but with different polarities are applied to the pairs of data lines.

The switching element of each pixel may be connected to only one of the pair of data lines, and the switching elements of two neighboring pixels in a vertical direction of a pixel column may be alternatively connected to the pair of data lines.

The data driver may perform an N×2 inversion.

A pixel disposition of even numbered columns among pixel columns and a pixel disposition of odd numbered pixel columns may form mirror symmetry with respect to the data line interposed therebetween, and the data driver may perform an N×1 inversion.

A liquid crystal display according to an exemplary embodiment of the present invention includes: a plurality of pixels arranged in a matrix shape and respectively including a first subpixel and a second subpixel; first and second switching elements connected to the first and second subpixels; data lines and gate lines connected to the first and second subpixels; and a data driver generating a data voltage and applying the data voltage to the data line. The data lines are disposed at both sides of the pixels in pairs, and data voltages of the same magnitude with different polarities are applied to the pairs of data lines.

The first and second switching elements of the pixels may be respectively connected to different data lines of the pairs of data lines, and the data driver may perform an N×2 inversion.

Alternatively, the data driver may perform an N×1 inversion.

A pixel disposition of even numbered columns among pixel columns and a pixel disposition of odd numbered pixel columns may form mirror symmetry with respect to the data lines interposed therebetween.

The first and second switching elements of the first and second subpixels of a neighboring pixel in a column direction may be connected to the same data line.

A pixel disposition of even numbered columns among pixel columns and a pixel disposition of odd numbered pixel columns may form mirror symmetry with respect to the data lines interposed therebetween.

BRIEF DESCRIPTION OF THE DRAWINGS

The accompanying drawings briefly described below illustrate exemplary embodiments of the present invention and, together with the description, serve to explain the principles of the present invention.

DETAILED DESCRIPTION OF EXEMPLARY EMBODIMENTS

The present invention will now be described more fully hereinafter with reference to the accompanying drawings, in which exemplary embodiments of the invention are shown.

A liquid crystal display according to an exemplary embodiment of the present invention will now be explained in detail with reference to FIG. 1 and FIG. 2.

Figure 1:
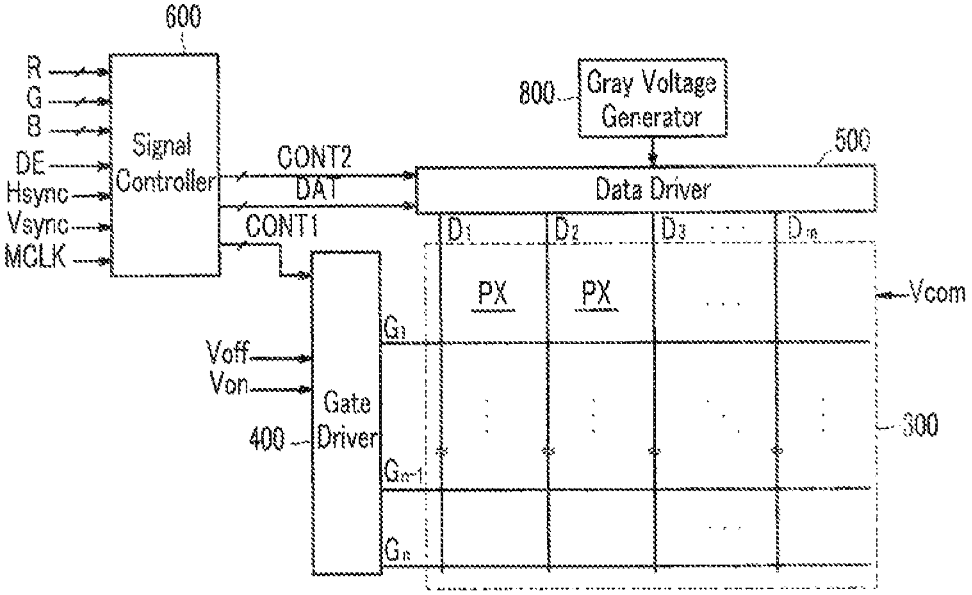
FIG. 1 is a block diagram of a liquid crystal display according to an exemplary embodiment of the present invention.
Figure 2:
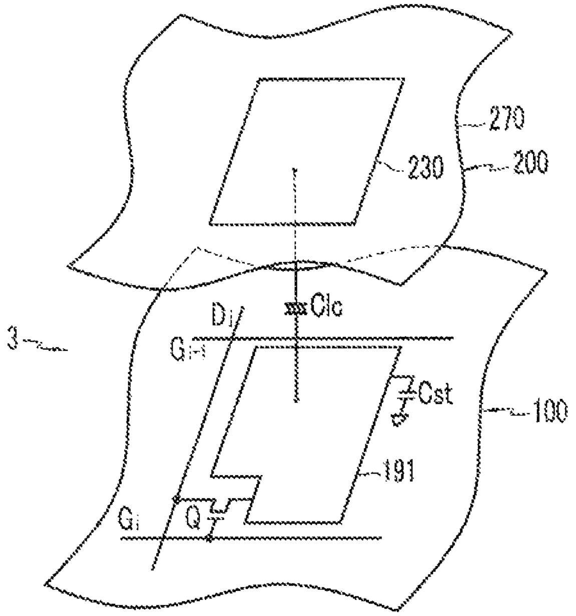
FIG. 2 is an equivalent circuit diagram of one pixel of a liquid crystal display according to an exemplary embodiment of the present invention.

FIG. 1 is a block diagram of a liquid crystal display according to an exemplary embodiment of the present invention, and FIG. 2, is an equivalent circuit diagram of one pixel of a liquid crystal display according to an exemplary embodiment of the present invention.

As shown in FIG. 1, a liquid crystal display according to an exemplary embodiment of the present invention includes a liquid crystal panel assembly 300, a gate driver 400 and a data driver 500 connected to the liquid crystal panel assembly 300, a gray voltage generator 800 connected to the data driver 500, a signal controller 600 controlling these elements.

In a point of view of an equivalent circuit, the liquid crystal panel assembly 300 includes a plurality of signal $G_1$ to $G_n$ and $D_1$ to $D_m$, and a plurality of pixels PX connected to the signal lines and substantially arranged in a matrix shape. Meanwhile, in a structure shown in FIG. 2, the liquid crystal panel assembly 300 of FIG. 1 includes lower and upper panels 100 and 200 that face each other, and a liquid crystal layer 3 (not shown) that is interposed between the panels 100 and 200.

The signal lines $G_1$ to $G_n$ and $D_1$ to $D_m$ include a plurality of gate lines $G_1$ to $G_n$ that transmit gate signals, also referred to as "scanning signals", and a plurality of data lines $D_1$ to $D_m$ that transmit data signals. The gate lines $G_1$ to $G_n$ extend in a row direction to be substantially parallel to one another, and the data lines $D_1$ to $D_m$ extend in a column direction to be substantially parallel to one another.

Each pixel PX, for example, the pixel PX connected to the i-th (i=1,2, . . . , n) gate line $G_i$ and the j-th (j=1, 2, . . . , m) date line Dj includes a switching element Q connected to the signal lines $G_i$ and $D_j$ and a liquid crystal capacitor Clc and a storage capacitor Cst connected to the switching element Q. If desired, the storage capacitor Cst can be omitted.

The switching element Q is a three terminal element, such as a thin film transistor, provided to the lower panel 100, a control terminal thereof is connected to the gate line $G_i$, an input terminal thereof is connected to the data line $D_j$, and an output terminal thereof is connected to the liquid crystal capacitor Clc and the storage capacitor Cst.

The liquid crystal capacitor Clc has two terminals, one connected to a pixel electrode 191 of the lower panel 100, and the other connected to a common electrode 270 of the upper panel 200. The liquid crystal layer 3 between the two electrodes 191 and 270 serves as a dielectric material. The pixel electrode 191 is connected to the switching element Q, and the common electrode 270 can be formed on the entire surface of the upper panel 200. A common voltage Vcom is applied to the common electrode 270. Unlike what is shown in FIG. 2, the common electrode 270 may be provided on the lower panel 100. In this case, at least one of the two electrodes 191 and 270 can be formed in a linear or a bar shape.

The storage capacitor Cst, which supplements the liquid crystal capacitor Clc, has a separate signal line (not shown) and is formed when the pixel electrodes 191 provided on the lower panel 100 overlap each other with an insulator interposed therebetween. A fixed voltage such as the common voltage Vcom is applied to the separate signal line. The storage capacitor Cst may also be formed by the pixel electrode 191 and the overlying previous gate line arrange to overlap each other through the insulator.

The color display, each pixel PX uniquely displays one of three primary colors (spatial division) or each pixel PX alternately displays the three primary colors (temporal division) as time lapses, and a desired color is recognized by a spatial or temporal sum of the primary colors. Examples of the three primary colors include red, green, and blue. FIG. 2 shows an example of spatial division. In this example, each pixel PX has a color filter 230 for one of the primary colors in a region of the upper panel 200 corresponding to the pixel electrode 191. Unlike what is shown in FIG. 2, the color filter 230 may be formed above or below the pixel electrode 191 of the lower panel 100.

At least one polarizer (not shown) for polarizing light is attached to an outer surface of the liquid crystal panel assembly 300.

Referring again to FIG. 1, the gray voltage generator 800 generates two sets of gray voltage related to the light transmittance of the pixel PX forming a set of reference gray voltages. The two sets of gray voltages have a positive value and a negative value with respect to the common voltage Vcom, respectively.

The gate driver 400 is connected to the gate lines $G_1$ to $G_n$ of the liquid crystal panel assembly 300, and applies the gate signals, which are combinations of a gate-on voltage Von and a gate-off voltage Voff, to the gate lines $G_1$ to $G_n$.

The data driver 500 is connected to the data lines $D_1$ to $D_m$ of the liquid crystal panel assembly 300. The data driver 500 selects one of the gray voltages from the gray voltage generator 800, and applies the selected gray voltage to the data lines $D_1$ to $D_m$ as a data signal. In the case, however, that the gray voltage generator 800 supplies only a predetermined number of the reference gray voltages, rather than the voltages for all gray levels, the data driver 500 divides the reference gray voltage so as to generate the gray voltages for all gray levels and selects the data voltage from among these.

The signal controller 600 controls the gate driver 400, the data driver 500, and other elements.

Each of such display driving elements 400, 500, 600, and 800 may be directly mounted on the liquid crystal panel assembly 300 in the form of at least one IC chip, may be attached to the liquid crystal panel assembly 300 while being mounted on a flexible printed circuit film (not shown) by a TCP (tape carrier package), or may be mounted on a separate printed circuit board (not shown). Alternatively, the driving elements 400, 500, 600, or 800 may be integrated with the liquid crystal panel assembly 300, together with the signal lines $G_1$ to $G_n$ and $D_1$ to $D_m$ and the thin film transistor switching element Q. Alternatively, the driving elements 400, 500, 600, or 800 may be integrated into a single chip. In this case, at least one of the elements, or at least one circuit element constituting the elements, may be outside the single chip.

The display operation of the liquid crystal display will now be described in detail.

The signal controller 600 receives input image signals R, G, and B and input control signals for controlling display of the input image signals R, G, and B. Examples of the input control signals include a vertical synchronization signal Vsync, a horizontal synchronizing signal Hsync, a main clock signal MCLK, a data enable signal DE, and the like.

The signal controller 600 processes the input image signals R, G, and B according to the operating condition of the liquid crystal panel assembly 300 on the basis of the input image signals R, G, and B and the input control signals, and generates a gate control signal CONT1 and a data control signal CONT2. Then, the signal controller 600 supplies the gate control signal CONT1 to the gate driver 400 and supplies the data control signal CONT2 and the processed image signal DAT to the data driver 500.

The gate control signal CONT1 may include a scanning start signal that instructs to start scanning, and at least one gate clock signal controlling an output timing of a gate-on voltage Von. The gate control signal CONT1 may further include an output enable signal limiting a duration time of the gate-on voltage Von.

The data control signal CONT2 includes a horizontal synchronization start signal that notifies transmission of the output image signal DAT to one row of pixels PX, a load signal instructing to apply the data signal to the data lines $D_1$ to $D_m$, and a data clock signal. The data control signal CONT2 may also further include an inversion signal for inverting the voltage polarity of the data signal relative to the common voltage Vcom, hereinafter, the voltage polarity of the data signal relative to the common voltage is simply referred to as the polarity of the data signal.

On the basis of the data control signal CONT2 from the signal controller 600, the data driver 500 receives the digital image signal DAT for one row [set] of pixels PX, and selects the gray voltage corresponding to each digital image signal DAT from the gray voltage generator. Then, the data driver 500 coverts the digital image signal DAT into an analog data signal, and applies the analog data signal to the corresponding data lines $D_1$ to $D_m$.

The gate driver 400 applies the gate-on voltage Von to the gate lines $G_1$ to $G_n$ on the basis of the gate control signal CONT1 from the signal controller 600 so as to turn on the switching element Q connected to the gate lines $G_1$ to $G_n$. Accordingly, the data signal applied to the data lines $D_1$ to $D_m$ is applied to the corresponding pixel PX through the turned-on switching element Q.

A difference between the voltage of the data signal applied to the pixel PX and the common voltage Vcom becomes a charge voltage of the liquid crystal capacitor Clc, that is, it becomes a pixel voltage. The alignment of liquid crystal molecules varies according to the value of the pixel voltage and thus, the polarization of light passing through the liquid crystal layer 3 is changed. The change in polarization causes a change in transmittance of light by the polarizers attached to the display panel assembly 300.

By repeating this operation for every one horizontal period (referred to as "1H"), which is equal to one cycle of the horizontal synchronizing signal Hsync and the data enable signal DE, the gate-on voltage Von is sequentially applied to all of the gate lines $G_1$ to $G_n$, and the data signal is applied to all of the pixels PX, so that an image corresponding to one frame is displayed.

When one frame is completed, and a next frame starts, the state of the inversion signal to be applied to the data driver 500 is controlled such that the polarity of the data voltage to be applied to each pixel is opposite to the polarity thereof in the previous frame ("frame inversion"). At this time, the polarity of the data signal on one data line may be changed in one frame according to the characteristics of the inversion signal, for example, row inversion or dot inversion, or the polarity of the data signal applied to one pixel row may be different from each other, for example, column inversion or dot inversion.

The pixel disposition of a liquid crystal display according to an exemplary embodiment of the present invention will now be explained in detail with reference to FIG. 3 to FIG. 8D.

Figure 3:
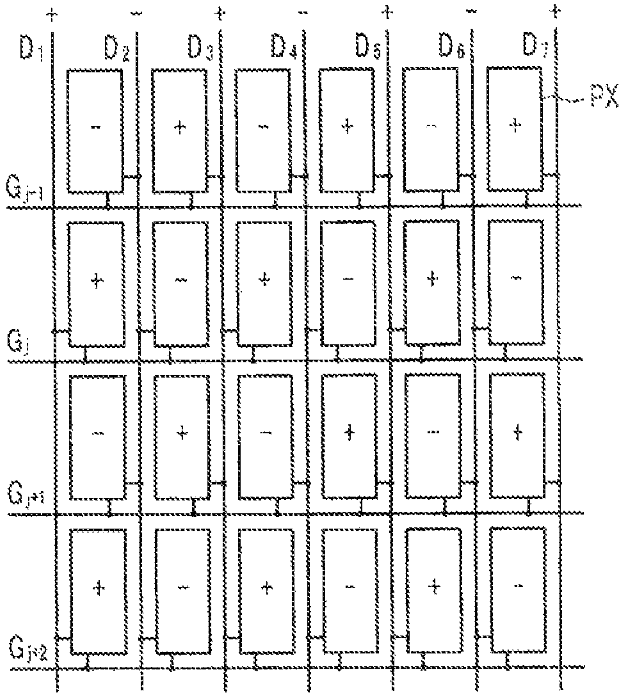
FIG. 3 is a drawing showing pixel disposition of a liquid crystal display according to an exemplary embodiment of the present invention.

FIG. 3 is a drawing showing pixel disposition of a liquid crystal display according to an exemplary embodiment of the present invention.

Here, for better comprehension and ease of description, only a portion ($D_1$ to $D_7$) of the data lines and only a portion ($G_{j-1}$ to $G_{j+2}$) of the gate lines are shown, and the data driver 500 performs a column inversion as shown by the polarities on the data lines $D_1$ $D_7$. In this case, the column inversion can include repeating the same polarity in one time (not shown), as well as alternating a positive polarity and a negative polarity. For example, the column inversion includes the case in which two polarities of the data voltage are alternately repeated such as '+, −, +, −, +, −, . . .', that is N×1 inversion, and the case in which the same polarity is repeated in one time and then the polarity is inverted, N×2 inversion (not shown). Furthermore, the case in which a separate voltage is applied only to the left-end data line and 1+N×2 inversion driving is performed will simply be called the N×2 inversion hereinafter. In addition, although the switching elements Q of the pixels PX are connected to the data lines $D_1$ to $D_7$ and the gate lines $D_1$ to $D_7$ and $G_{j-1}$ to $G_{j+2}$, explanations will be made for the case that the pixels PX are connected to the two signal lines $D_1$ to $D_7$ and $G_{j-1}$ to $G_{j+2}$.

As shown in FIG. 3, respective pixels PX of one row are connected to the data lines $D_1$ to $D_7$ positioned at the left or the right thereof, and the pixels of one column are alternately connected to the data lines $D_1$ to $D_7$ positioned at the left and the right thereof. Accordingly, the polarity of data voltages appearing in the pixels PX, hereinafter referred to as the polarity of the pixels, alternately shows a positive (+) polarity and a negative (−) polarity, and this results in the performing of dot inversion. Accordingly, the stripe defect that is generated when polarities of the pixels PX of one column are equal to one another can be prevented.

Figure 4:
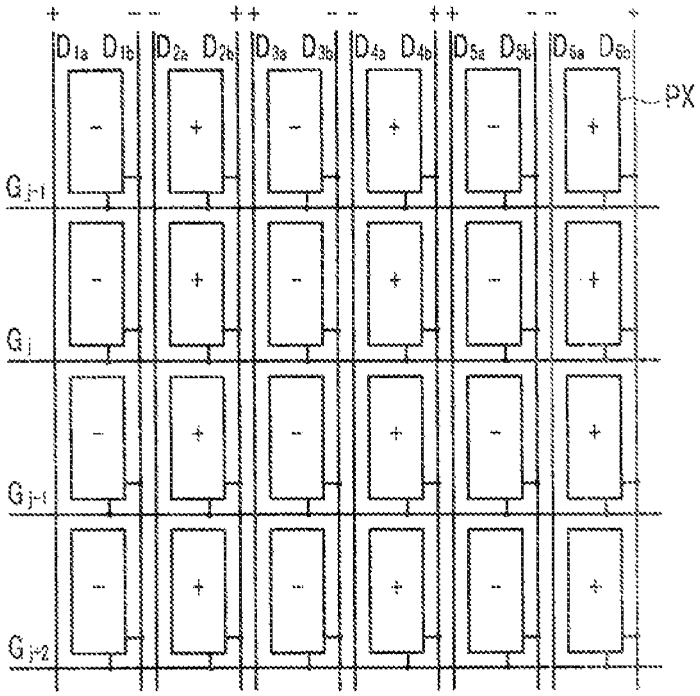
FIG. 4 is a drawing showing an example of pixel disposition of a liquid crystal display according to an exemplary embodiment of the present invention.
Figure 5:
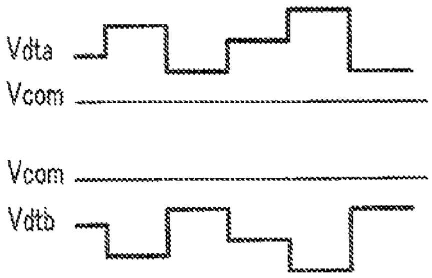
FIG. 5 is a waveform diagram for explaining a principle of removing a coupling defect in the pixel disposition shown in FIG. 4.

FIG. 4 is a drawing showing an example of pixel disposition of a liquid crystal display according to an exemplary embodiment of the present invention.

Referring to FIG. 4, unlike what is shown in FIG. 3, pairs of data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, and $D_{6a}$ and $D_{6b}$ are respectively disposed at the left and right of the respective pixels PX, and the pixels PX are respectively connected to the data lines $D_{1b}$, $D_{2b}$, $D_{3b}$, $D_{4b}$, $D_{5b}$, and $D_{6b}$ that are positioned at the right thereof.

Accordingly, polarities of the pixels PX of one row are alternately changed, and polarities of the pixels PX of one column are all the same. The polarities of the data lines $D_{1a}$, $D_{2a}$, $D_{3a}$, $D_{4a}$, $D_{5a}$, and $D_{6a}$ to which the pixels PX are not connected among the pairs of data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, and $D_{6a}$ and $D_{6b}$ are opposite to the polarities of the data lines $D_{1b}$, $D_{2b}$, $D_{3b}$, $D_{4b}$, $D_{5b}$, and $D_{6b}$ to which the pixels PX are connected.

For example, in the pair of data lines $D_{1a}$ and $D_{1b}$ include in the first column, the data voltage Vdtb of a negative polarity is applied to the right data line $D_{1b}$, and the data voltage Vdtb of a positive polarity is applied to the left data line $D_{1a}$. These data voltages are shown with respect to the common voltage Vcom in FIG. 5. That is, the data voltage of the same magnitude as the data voltage applied to the right data line $D_{1b}$ but having the opposite polarity to that of the data voltage applied to the right data line $D_{1b}$ is applied to the left data line $D_{1a}$. This causes voltages across parasitic capacitors in respective pixels PX to offset each other, so that the coupling defect does not occur.

Figure 6A:
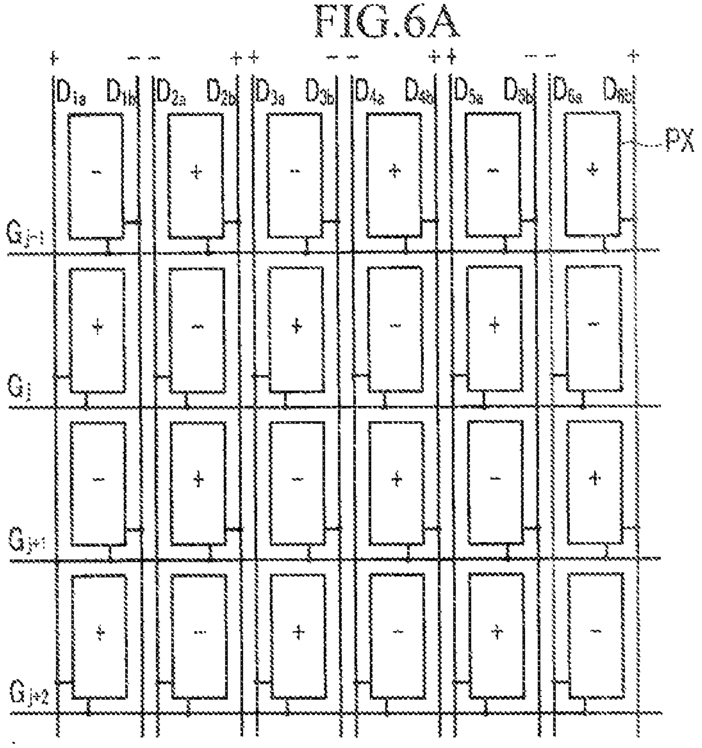
FIG. 6A and FIG. 6B are drawings showing exemplary variations of the pixel disposition shown in FIG. 4.
Figure 6B:
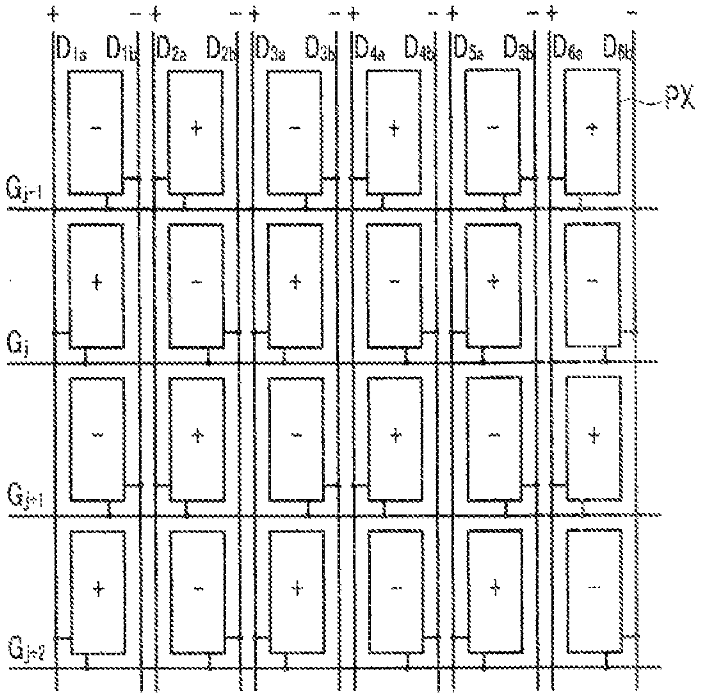

FIG. 6A and FIG. 6B are drawings showing exemplary variations of the pixel disposition shown in FIG. 4.

In the pixel disposition shown in FIG. 6A, the pixels PX of the same row are respectively connected to the same data lines $D_{1b}$, $D_{2b}$, $D_{3b}$, $D_{4b}$, $D_{5b}$, and $D_{6b}$, or $D_{1a}$, $D_{2a}$, $D_{3a}$, $D_{4a}$, $D_{5a}$, and $D_{6a}$, and the pixels PX of the same column are respectively alternately connected to the pairs of data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, and $D_{6a}$ and $D_{6b}$ per row. In the pixel disposition shown in FIG. 6B, the pixel disposition in the odd numbered columns is equal to the pixel disposition shown in FIG. 6A, and the pixel disposition in the even numbered columns and the pixel disposition in the odd numbered columns form mirror symmetry with respect to the data lines interposed therebetween. For example, the pixel disposition of the second column and the pixel disposition of the first column form mirror symmetry with respect to the data lines $D_{1b}$ and $D_{2a}$.

The stripe defect may occur in the pixel disposition shown in FIG. 4, since polarities of the data voltages applied to the pixels PX of one column are the same. The pixel dispositions shown in FIG. 6A and FIG. 6B, however, can prevent not only the coupling defect but also the stripe defect.

Figure 7:
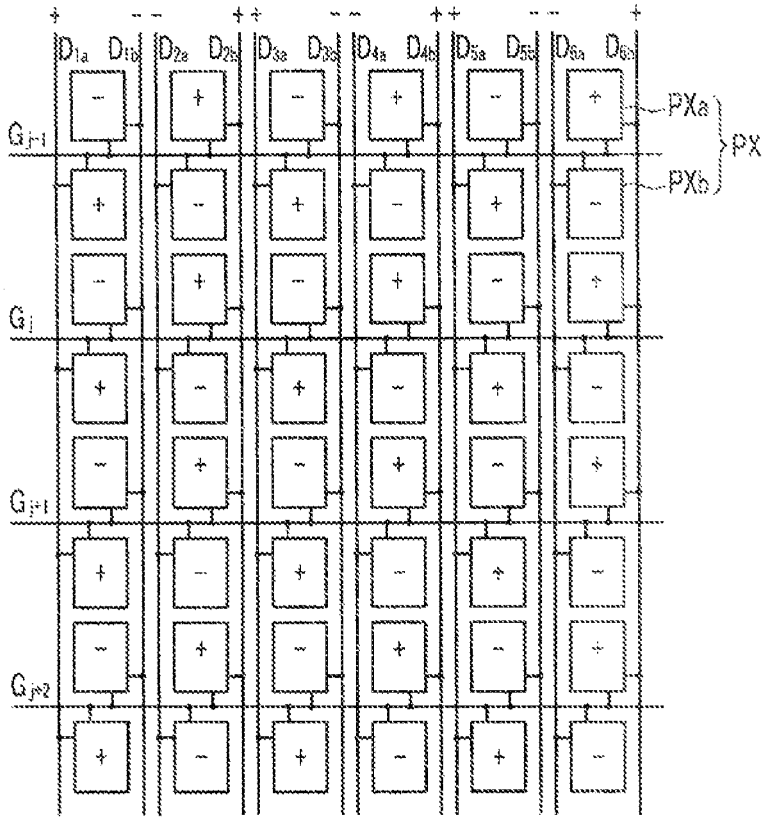
FIG. 7 is a drawing showing pixel disposition of a liquid crystal display according to an exemplary embodiment of the present invention.

FIG. 7 is a drawing showing pixel disposition of a liquid crystal display according to an exemplary embodiment of the present invention, and FIG. 8A to FIG. 8D are drawings showing exemplary variations of the pixel disposition shown in FIG. 7.

FIG. 7 shows a pixel structure obtained by dividing respective pixels PX in the pixel structure shown in FIG. 4, FIG. 6A, and FIG. 6B into two subpixels PXa and PXb with respect to the gate lines $G_{j-1}$ to $G_{j+2}$. This is a structure for enhancing side visibility, and is mainly used in a liquid crystal display of a vertical alignment (VA) mode.

Two subpixels PXa and PXb constituting one pixel PX are respectively connected to different data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, or $D_{6a}$ and $D_{6b}$, and this structure is repeated in the row direction and in the column direction, so that polarities of the pixels PX as shown in the drawing are formed.

Since polarities of the data lines of the pairs of data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, and $D_{6a}$ and $D_{6b}$ between which the pixels PX are disposed are opposite to each other, the coupling defect does not occur. In addition, since polarities of the pixels PX in one column are alternately repeated, the stripe defect does not occur.

Figure 8A:
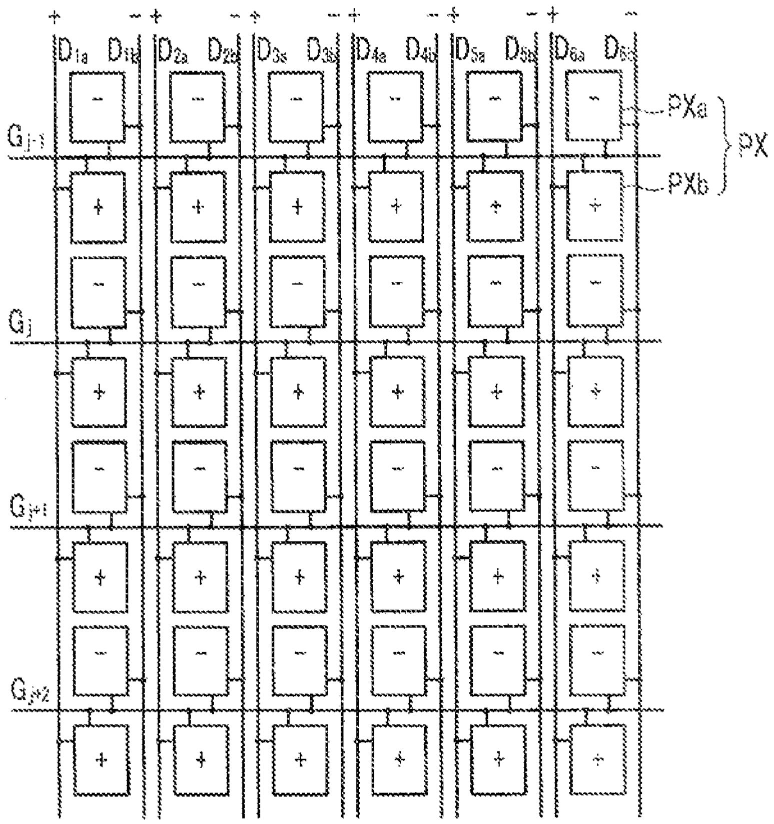
FIG. 8A to FIG. 8D are drawings showing exemplary variations of the pixel disposition shown in FIG. 7.

The pixel disposition shown in FIG. 8A is equal to the pixel disposition shown in FIG. 7. They differ, however, in the polarities of the applied data voltages, and thereby polarities of the pixels PX become different even in the same structure. That is, although polarities of the pixels PX show a positive polarity and a negative polarity in the row direction and in the column direction in the pixel disposition shown in FIG. 7, polarities of the pixels PX are the same in the row direction in the pixel disposition shown in FIG. 8A. The coupling defect or the stripe defect, however, can be prevented even in this case.

Figure 8B:
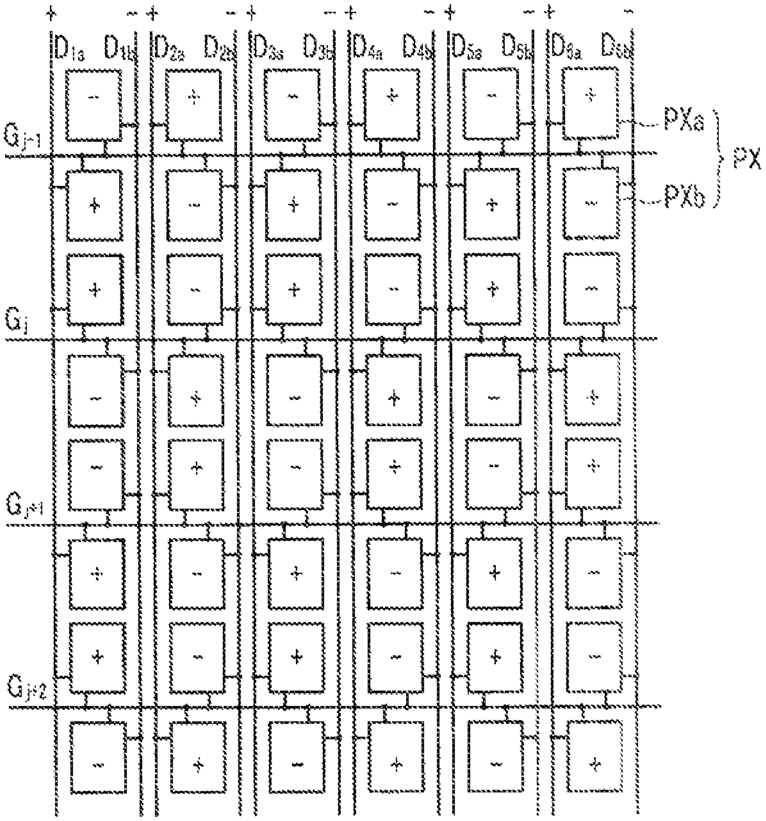

In the pixel disposition shown in FIG. 8B, two subpixels PXa and PXb constituting one pixel PX are respectively connected to different data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, or $D_{6a}$ and $D_{6b}$. Two neighboring subpixels of two neighboring pixels in the column direction, however, are connected to the same data line $D_{1a}$ or $D_{1b}$, $D_{2a}$ or $D_{2b}$, $D_{3a}$ or $D_{3b}$, $D_{4a}$ or $D_{4b}$, $D_{5a}$ or $D_{5b}$, or $D_{6a}$ or $D_{6b}$. For example, the lower subpixel PXb in the (j−1)-th row of the first column and the upper subpixel PXa in the neighboring j-th row of the fist column are connected to the same data line $D_{1a}$, and the lower subpixel PXb in the j-th row and the upper subpixel PXa in the neighboring (j+1)-th row are connected to the same data line $D_{1b}$.

Figure 8C:
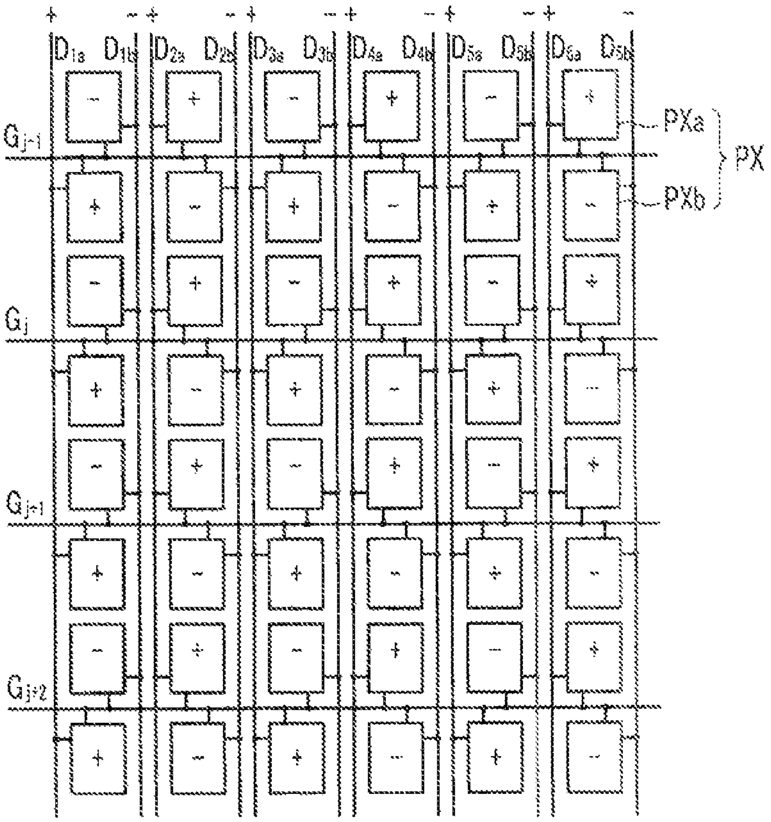

In the pixel disposition shown in FIG. 8C, the pixel disposition of the odd numbered columns is the same as the pixel disposition shown in FIG. 8B, and the pixel disposition of the even numbered columns and the pixel disposition of the odd numbered columns from mirror symmetry with respect to the data lines interposed therebetween. For example, the pixel disposition of the second column and the pixel disposition of the first column form mirror symmetry with respect to the data lines $D_{1b}$ and $D_{2a}$.

Figure 8D:
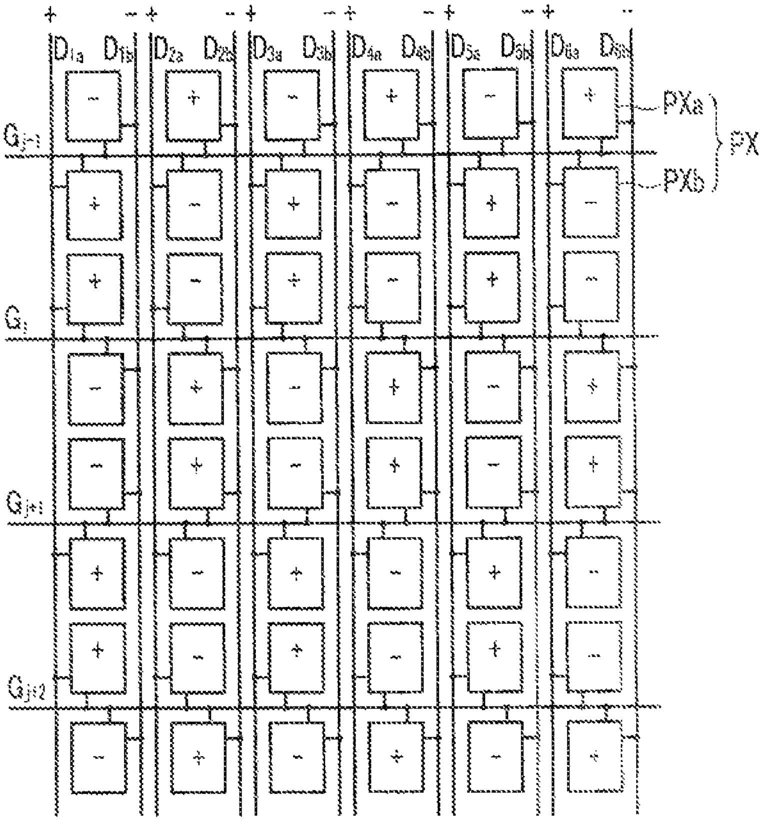

In the pixel disposition shown in FIG. 8D, the pixel disposition of the odd numbered columns is to the same as the pixel disposition shown in FIG. 7A. That is, two subpixels PXa and PXb constituting one pixel PX are respectively connected to different data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, or $D_{6a}$ and $D_{6b}$, and this structure is repeated in the column direction. The pixel disposition of the even numbered columns and the pixel disposition of the odd numbered columns form mirror symmetry with respect to the data lines interposed therebetween, just like the pixel disposition shown in FIG. 8C.

As such, data voltages of the same magnitude with different polarities are applied to the data lines of the respective pairs of data lines $D_{1a}$ and $D_{1b}$, $D_{2a}$ and $D_{2b}$, $D_{3a}$ and $D_{3b}$, $D_{4a}$ and $D_{4b}$, $D_{5a}$ and $D_{5b}$, and $D_{6a}$ and $D_{6b}$, and polarities of pixels in the column direction are alternately repeated, so that the coupling defect and the stripe defect can be prevented.

In this manner, while preventing the coupling defect and the stripe defect, high speed driving can be performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:

a plurality of pixels arranged in a matrix shape formed of rows and columns;

a plurality of switching elements, one switching element being respectively connected to each pixel of the plurality of pixels;

data lines disposed in pairs at both sides of each of the plurality of pixels;

gate lines connected to second terminals of the plurality of switching elements; and a data driver generating gray level data voltages and applying the gray level data voltages to the data lines, wherein gray level data voltages of the same magnitude with different respective polarities are simultaneously applied to the pairs of data lines for displaying all images of the display, and wherein first terminals of the plurality of switching elements are connected to a respective data line for each pixel.

2. The liquid crystal display of claim 1, wherein the plurality of switching elements are respectively connected to only one of the pair of data lines.

3. The liquid crystal display of claim 1, wherein the switching elements of two neighboring pixels in a vertical direction of a pixel column are alternately connected to the pair of data lines.

4. The liquid crystal display of claim 2, wherein the data driver performs an N×2 inversion.

5. The liquid crystal display of claim 3, wherein the data driver performs an N×2 inversion.

6. The liquid crystal display of claim 1, wherein a pixel disposition of even numbered columns among the pixel columns and a pixel disposition of odd numbered pixel columns form mirror symmetry with respect to the data lines interposed therebetween.

7. The liquid crystal display of claim 6, wherein the data driver performs an N×1 inversion.

8. A liquid crystal display, comprising:

a plurality of pixels arranged in a matrix shape formed of rows and columns and each including a first subpixel and a second subpixel;

a first switching element and a second switching element connected respectively to the first subpixel and the second subpixel;

data lines connected to the first subpixel and the second subpixel;

gate lines connected to the first subpixel and the second subpixel; and a data driver generating gray level data voltages and applying the gray level data voltages to the data lines, wherein the data lines are disposed in pairs at both sides of the pixels, and gray level data voltages of the same magnitude with different respective polarities are simultaneously applied to the pairs of data lines for displaying all images of the display.

9. The liquid crystal display of claim 8, wherein the first switching element and the second switching element of the pixels are respectively connected to different data lines of the pair of data lines.

10. The liquid crystal display of claim 9, wherein the data driver performs an N×2 inversion.

11. The liquid crystal display of claim 9, wherein the data driver performs an N×1 inversion.

12. The liquid crystal display of claim 9, wherein a pixel disposition of even numbered columns among the pixel columns and a pixel disposition of odd numbered pixel columns form mirror symmetry with respect to the data lines interposed therebetween.

13. The liquid crystal display of claim 9, wherein the first switching element of the first subpixel and the second switching element of and the second subpixel of two neighboring pixels in a column direction are connected to the same data line.

14. The liquid crystal display of claim 11, wherein a pixel disposition of even numbered columns of the pixel columns and a pixel disposition of odd numbered pixel columns form mirror symmetry with respect to the data lines interposed therebetween.

15. A liquid crystal display, comprising:

a plurality of pixels arranged in a matrix shape formed of rows and columns and each including a first subpixel. and a second subpixel;

a first switching element and a second switching element connected respectively to the first subpixel and the second subpixel;

a plurality of data lines connected to the first subpixel and the second subpixel, and comprising a first data line and a second data line;

a plurality of gate lines connected to the first subpixel and the second subpixel; and a data driver generating gray level data voltages and applying the gray level data voltages to the plurality of data lines, wherein the first data line and the second data line are disposed at both sides of each pixel respectively, the first switching element and the second switching element of the respective pixels are connected to the same gate lines, and gray level data voltages of the same magnitude with different respective polarities are simultaneously applied to the first and the second data lines for displaying all images of the display.

16. The liquid crystal display of claim 15, wherein the data driver performs an N×1 inversion.

17. The liquid crystal display of claim 16, wherein the first switching element of each pixel is connected to the second data line and the second switching element thereof is connected to the first data line.

18. The liquid crystal display of claim 16, wherein the pixels comprise a first pixel and a second pixel adjacent to each other in a row direction, and the first switching element of the second pixel is connected to the first data line and the second switching element of the first pixel is connected to the second data line.

19. The liquid crystal display of claim 16, wherein the pixels comprise a first pixel and a second pixel adjacent to each other in a column direction, and the first switching element and the second switching element of the first pixel are respectively connected to the second data line and the first data line, and the first switching element and the second switching element of the second pixel are respectively connected to the first data line and the second data line.

20. The liquid crystal display of claim 19, wherein the pixels comprises a third pixel adjacent to the first pixel and a fourth pixel adjacent to the second pixel in a row direction, respectively, and the first switching element and the second switching element of the third pixel are respectively connected to the first data line and the second data line, and the first switching element and the second switching element of the fourth pixel are respectively connected to the second data line and the first data line.

21. The liquid crystal display of claim 1, wherein each row of pixels is connected to a respective gate line and each pixel in the each row is connected to the same respective gate line.

22. The liquid crystal display of claim 1, wherein each of the plurality of switching elements connected to the plurality of pixels disposed between the pair of data lines are respectively connected to a same only one of the pair of data lines.

* * * * *